United States Patent
Vemula et al.

(10) Patent No.: US 9,256,416 B1
(45) Date of Patent: Feb. 9, 2016

(54) METHODS AND APPARATUS FOR AUTOMATIC SESSION VALIDATION FOR DISTRIBUTED ACCESS POINTS

(71) Applicant: JUNIPER NETWORKS, INC., Sunnyvale, CA (US)

(72) Inventors: Murali Vemula, Fremont, CA (US); Siva Madasamy, San Jose, CA (US); Srihari Ramachandra, Bangalore (IN); Pradeep Kudethur, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/852,602

(22) Filed: Mar. 28, 2013

(51) Int. Cl.
*G06F 9/445* (2006.01)

(52) U.S. Cl.
CPC .................................. *G06F 8/61* (2013.01)

(58) Field of Classification Search
CPC .............................................................. G06F 8/61
USPC ........................ 717/168–178; 709/220–222
See application file for complete search history.

(56) References Cited

U.S. PATENT DOCUMENTS

| | | | | |
|---|---|---|---|---|
| 6,832,373 | B2 * | 12/2004 | O'Neill .......................... | 717/171 |
| 6,925,467 | B2 * | 8/2005 | Gu et al. ....................... | 707/687 |
| 7,219,344 | B2 * | 5/2007 | Chenelle et al. .............. | 717/177 |
| 2002/0157090 | A1 * | 10/2002 | Anton, Jr. ...................... | 717/178 |
| 2004/0025052 | A1 * | 2/2004 | Dickenson .................... | 713/201 |
| 2005/0229173 | A1 * | 10/2005 | Mihm et al. ................... | 717/171 |
| 2007/0067625 | A1 * | 3/2007 | Jiang et al. .................... | 713/168 |
| 2008/0084855 | A1 * | 4/2008 | Rahman ........................ | 370/342 |
| 2010/0136984 | A1 * | 6/2010 | Brisebois ....................... | 455/446 |
| 2012/0054535 | A1 * | 3/2012 | Wong .............................. | 714/4.1 |
| 2012/0317224 | A1 * | 12/2012 | Caldwell et al. ............. | 709/217 |
| 2013/0074061 | A1 * | 3/2013 | Averbuch et al. ............. | 717/171 |
| 2013/0346957 | A1 * | 12/2013 | Khandelwal et al. ......... | 717/170 |

FOREIGN PATENT DOCUMENTS

| | | | |
|---|---|---|---|
| CN | 102340762 A | * | 2/2012 |
| WO | WO 2013002629 A1 | * | 1/2013 |

OTHER PUBLICATIONS

Honcharenko, Walter, et al. "Broadband wireless access." Communications Magazine, IEEE 35.1 (1997), pp. 20-26.*
Kim, Hyojoon, and Nick Feamster. "Improving network management with software defined networking." Communications Magazine, IEEE 51.2 (2013), pp. 114-119.*
Lin, Hui-Tang, et al. "An integrated WiMAX/WiFi architecture with QoS consistency over broadband wireless networks." Consumer Communications and Networking Conference, 2009. CCNC 2009. 6th IEEE. IEEE, 2009. pp. 1-7.*

* cited by examiner

*Primary Examiner* — Satish Rampuria
(74) *Attorney, Agent, or Firm* — Cooley LLP (57) ABSTRACT

In some embodiments, a method includes installing at an access point that (1) includes a first software image and (2) is operatively coupled to a network controller via network, a second software image different from the first software image. The method includes defining in response to the installation, a virtual client disposed in the access point. The virtual client is configured to send to the network controller via the network a first validation data unit that causes the network controller to send a second validation data unit to the access point if the first validation data unit is received by the network controller. The method also includes installing at the access point that includes the second software image, the first software image and uninstalling the second software image if the access point does not receive the second validation data unit in response to the first validation data unit.

18 Claims, 5 Drawing Sheets

```
┌─────────────────────────────────┐
│ Receive, from a network         │
│ controller, an indication of a  │
│ network fault.                  │
│ 602                             │
└─────────────────────────────────┘
              │
              ▼
┌─────────────────────────────────┐
│ Define, in response to the      │
│ indication, a virtual client    │
│ disposed in an access point.    │
│ 604                             │
└─────────────────────────────────┘
              │
              ▼
┌─────────────────────────────────┐
│ Send, from the virtual client,  │
│ a first validation data unit.   │
│ 606                             │
└─────────────────────────────────┘
              │
              ▼
┌─────────────────────────────────┐
│ Send, in response to receiving  │
│ the first validation data unit, │
│ a second validation data unit.  │
│ 608                             │
└─────────────────────────────────┘
              │
              ▼
         ╱─────────╲
       ╱  Has the   ╲
     ╱ access point   ╲
    ╱ received the     ╲
    ╲ second validation╱
     ╲ data unit?     ╱
       ╲    610     ╱
         ╲─────────╱
       Yes  /    \  No
           /      \
```

| Send, a signal indicative of a receipt of the second validation data unit. 612 | Send, a signal indicative of a failure of receipt of the second validation data unit. 614 |

FIG. 6

METHODS AND APPARATUS FOR AUTOMATIC SESSION VALIDATION FOR DISTRIBUTED ACCESS POINTS

BACKGROUND

Some embodiments described herein relate generally to methods and apparatus for automatic network session validation and network session management for distributed access points and for the establishment of network sessions for distributed access points. For example, some embodiments described herein relate to methods and apparatus for testing the end-to-end network connectivity of distributed access points with a network controller upon installing a new software image on the access points. Additionally, some embodiments described herein relate to methods and apparatus for detecting whether a reported network fault is associated with a given access point.

In networks involving distributed access points, upgrading an existing software or installing new software on the access points can involve establishing a network session between the access points and a network controller and checking for the connectivity of the network session. Manual testing of network connectivity for each access point in the network by a network administrator can be cumbersome and time consuming. Additionally, in the event of notification of network failure, manually testing the connectivity of each access point with a network controller to diagnose the source of the network failure can also be cumbersome and time consuming.

Accordingly, a need exists for methods and apparatus to automatically enable testing of end-to-end network connectivity and to establish network sessions for distributed access points without the need for manual intervention by a network administrator.

SUMMARY

In some embodiments, a method includes installing at an access point that (1) includes a first software image and (2) is operatively coupled to a network controller via network, a second software image different from the first software image. The method includes defining in response to the installation, a virtual client disposed in the access point. The virtual client is configured to send to the network controller via the network a first validation data unit that causes the network controller to send a second validation data unit to the access point if the first validation data unit is received by the network controller. The method also includes installing at the access point that includes the second software image, the first software image and uninstalling the second software image if the access point does not receive the second validation data unit in response to the first validation data unit.

DETAILED DESCRIPTION

In some embodiments, a method includes installing at an access point that (1) includes a first software image and (2) is operatively coupled to a network controller via network, a second software image different from the first software image. The method includes defining in response to the installation, a virtual client disposed in the access point. The virtual client is configured to send to the network controller via the network a first validation data unit that causes the network controller to send a second validation data unit to the access point if the first validation data unit is received by the network controller. The method also includes installing at the access point that includes the second software image, the first software image and uninstalling the second software image if the access point does not receive the second validation data unit in response to the first validation data unit.

In some embodiments, an apparatus includes an access point configured to be operatively coupled to a network controller via a network, where the access point includes a validation module, a first virtual client and a second virtual client. The first virtual client can be configured to send a validation data unit via the network to the second virtual client. The validation module is configured to send a signal indicative of successful installation of the software image in response to receiving an indication that the second virtual client received the validation data unit.

In some embodiments, a method includes receiving at an access point and from a network controller via a network, an indication of a network fault. The method includes defining, in response to the indication, a virtual client disposed on the access point. The virtual client is configured to send to the network controller, a first validation data unit that causes the network controller to send a second validation data unit. The method also includes the access point sending to the network controller a signal indicative of a receipt of the second validation data unit if the access point receives the second validation data unit in response to the first validation data unit.

As used in this specification, the singular forms "a," "an" and "the" include plural referents unless the context clearly dictates otherwise. Thus, for example, the term "an access point" is intended to mean a single access point or multiple access points.

Figure 1:
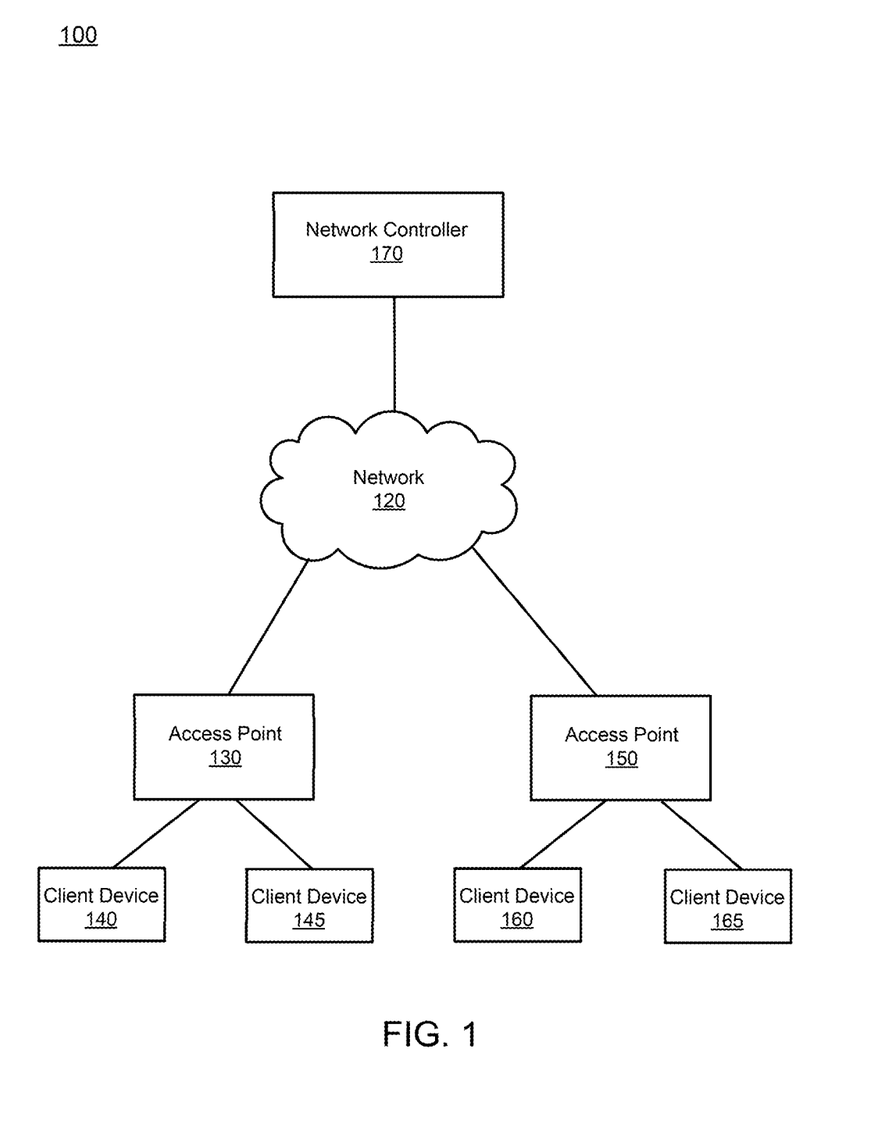
FIG. 1 is a schematic illustration of a system for automatic network session validation and network session management for distributed access points, according to an embodiment.

FIG. 1 is a schematic illustration of a system 100 for automatic network session validation and network session management for distributed access points, according to an embodiment. The system 100 includes a network controller 170, a network 120, access point 130 that is operably coupled to client devices 140 and 145, and access point 150 that is operably coupled to client devices 160 and 165. The network 120 can be any type of network (e.g., a local area network (LAN), a wide area network (WAN), a virtual network, and a telecommunications network) implemented as a wired network and/or wireless network. As described in further detail herein, in some instances, for example, the client device 140 can be connected to the network controller 170 via the access point 130 and a network (e.g., network 120) such as an intranet, an Internet Service Provider (ISP) and the Internet, a Wi-Fi® network, a cellular network, and/or the like.

The network controller 170 can be, for example, a server or a host machine such as for example, a web server, an application server, a proxy server, a telnet server, and/or a file transfer protocol (FTP) server. The network controller 170 can also be a personal computing device such as a desktop computer or a laptop computer. The network controller 170 can receive a first validation data unit from an access point 130 and/or 150 (that already includes a first software image) when a second software image is installed on the access point 130 and/or 150. Upon successfully receiving the first validation data unit, the network controller 170 can send a second validation data unit to the access point 130 and/or 150 via the network 120, where the second validation data unit is different from the first validation data unit. The network controller 170 can also receive a signal indicative of the successful installation of the second software image on an access point 130 and/or 150 when the access point 130 and/or 150 receives the second validation data unit from the network controller 170 in response to the first validation data unit.

In some instances, upon installation of the second software image on an access point 130 and/or 150, one or multiple virtual clients (not shown in FIG. 1) are defined within the access point 130 and/or 150 in response to installation of the second software image. The network controller 170 can receive a stream of data units from the one or multiple virtual clients defined within each access point 130 and/or 150. The network controller 170 can also receive a signal indicative of a time value associated with the elapsed time between sending the first validation data unit by the access point 130 and/or 150 and receipt of the second validation data unit (sent by the network controller 170) at the access point 130 and/or 150. In some instances, the network controller 170 can receive a signal indicative of a failure of a receipt of the second validation data unit (sent from the network controller 170) if the access point 130 and/or 150 does not receive the second validation data unit or if the access point 130 and/or 150 receives the second validation data unit after a set pre-determined time period. Once the access point successfully sends the first validation data unit to the network controller 170 and successfully receives the second validation data unit from the network controller 170 in response to the first validation data unit, the network controller 170 can receive a verification signal (different from a validation data unit) from the access point 130 and/or 150 that is indicative of the successful installation of the second software image on the access point 130 and/or 150.

The access points 130 and/or 150 can be any device that connects a wireless client device 140, 145, 160 and 165 to a network 120 using, for example, Institute of Electrical and Electronics Engineers (IEEE) 802.11x Wi-Fi®, Bluetooth®, or other wireless communication technology. In some cases, the access point 130 and/or 150 can be located on the same device together with an access network node (not shown in FIG. 1), such as a wireless Ethernet router equipped with a wireless transceiver. In other cases, the access point 130 and/or 150 can be a stand-alone device, such as a wireless access point (WAP).

In some instances, the access point 130 and/or 150 includes a first software image and is operatively coupled to the network controller 170 via the network 120. In such instances, the access point 130 and/or 150 can install a second software image different from the first software image. In such instances, the access point 130 and/or 150 can define a virtual client located at the access point 130 and/or 150 and send to the network controller 170 a first validation data unit. In such instances, if the access point 130 and/or 150 receives a second validation data unit (sent from the network controller 170) in response to the first validation data unit, the access point 130 and/or 150 can send a signal to the network controller 170 that is indicative of a successful installation of the second software package. In such instances, if the access point 130 and/or 150 does not receive a second validation data unit (from the network controller 170) in response to the first validation data unit or if the access point 130 and/or 150 receives the second validation data unit after a set pre-determined time period, the access point 130 and/or 105 can send a signal to the network controller 170 that is indicative of a failure of a receipt of the second validation data unit.

In other instances, the access point 130 and/or 150 can define a set of (or multiple) virtual clients in response to installing the second software image such that the number of virtual clients from the set of virtual clients consumes more than a threshold (e.g., fifty percent) of the computing resources of the access point 130 and/or 150. Upon defining the set of virtual clients, the access point 130 and/or 150 can successfully send a first validation data unit to the network controller 170 and can successfully receive a second validation data unit from the network controller 170 in response to the first validation data unit. The access points 130 and/or 150 can then send to the network controller 170 a verification signal (different from a validation data unit) that is indicative of the successful installation of the second software image on the access point 130 and/or 150.

The (wireless) client devices 140, 145, 160 and 165 can be, for example, any device that can receive data units from and/or send data units to an access point 130 and/or 150 through a wireless connection, such as, for example, a mobile phone, a Wi-Fi® enabled laptop computer, a Bluetooth® earphone, a personal digital assistant (PDA), a standard mobile telephone, a tablet personal computer (PC), and/or the like. The number of client devices allocated to each access point 130 and/or 150 can be determined by the total bandwidth of the access points 130 and/or 150 and the bandwidth demands of each client device.

The system 100 for network session validation and network session management for distributed access points as shown in FIG. 1 can allow for automatically testing the end to end network connectivity of distributed access points with a network controller upon installing a new software image on the access points without the manual intervention of a network administrator. Additionally, the system 100 for network session validation and network session management for distributed access points shown in FIG. 1 can also allow for automatically determining if the cause of a reported network fault is associated with an access point without the manual intervention of a network administrator. This system 100 can thus avoid the potentially cumbersome and time consuming process of manually testing for network connectivity and the causes of network failure, which can be useful in large networks with a large number of distributed access points where the network connectivity can be tested through software simulation.

Figure 2:
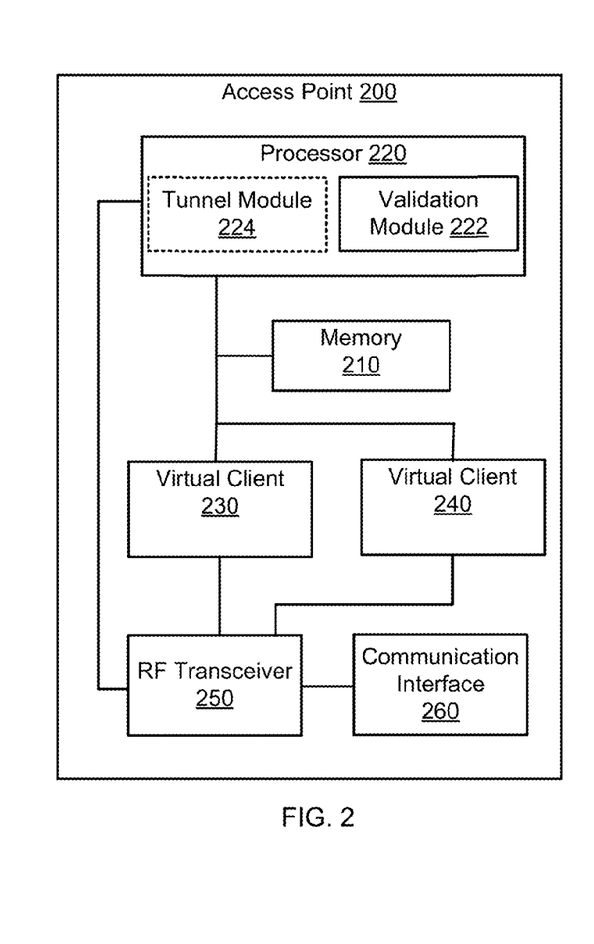
FIG. 2 is a system block diagram of an access point, according to an embodiment.

FIG. 2 is a system block diagram of an access point 200, according to an embodiment. Similar to access point 130 and access point 150 shown in FIG. 1, access point 200 can be any device that connects one or more wireless client devices to a network (e.g., via an access network node) using for example, Wi-Fi®, Bluetooth® or other wireless communication technology. For example, access point 200 can be a wireless access point (WAP). As shown in FIG. 2, access point 200 includes a memory 210, a processor 220 that includes a validation module 222 and optionally (as denoted by the dotted box) a tunnel module 224, virtual clients 230 and 240, a radio frequency (RF) transceiver 250 and a communications interface 260. Each of these components of the access point 200 is operatively coupled to the remaining components of the access point 200. Furthermore, all of the operations of the RF transceiver 250 (e.g., transmit/receive wireless data units), the communications interface 260 (e.g., transmit/receive wired data units), tunnel module 224 (e.g., encapsulate/decapsulate control and data units), as well as manipulations on memory 210, can be controlled by the processor 220.

The memory 210 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 210 can store instructions to cause the processor 220 to execute modules, processes and/or functions associated with the access point 200. The memory 210 can also store data and/or instructions related to control and operation of the access point 200. In one example, the memory 210 can store instructions that can allow the validation module 223 to define virtual clients 230 and/or 240 when a software image has been installed on the processor 220 of the access point 200, etc. In another example, the memory can contain a table or database (not shown in FIG. 2) that can store information regarding active network sessions and node management between the access point 200 and client devices (e.g., client devices 140, 145, 160, 165 in FIG. 1) and/or the network controller (e.g., network controller 170 in FIG. 1). Such a table or database can contain information pertaining to network sessions such as, for example, the access point port number involved in the network session with a client device, the MAC address of the client device in a network session with the access point, the time duration of a network session, the bandwidth consumed by a network session, the access point port number involved in the a network session with network controller, the IP and/or MAC address of the network controller, the port number of the network controller in the network session with the access point, and/or the like.

The processor 220 can be, for example, a general purpose processor, a Field Programmable Gate Array (FPGA), an Application Specific Integrated Circuit (ASIC), a Digital Signal Processor (DSP), and/or the like. The processor 220 can be configured to run and/or execute application processes and/or other modules, instructions, processes and/or functions associated with the access point 200. The processor 220 includes a validation module 222 that can define one or a set of virtual clients 230 and/or 240 in the access point 200 in response to installation of a software image in the access point 200. The validation module 222 can send a signal to a network controller (e.g., network controller 170 in FIG. 1) that is indicative of the successful installation of a software image (e.g., a first software image or a second software image) on the access point 200 if the access point 200 successfully receives a second validation data unit from the network controller in response to sending to the network controller a first validation data unit. The validation module 222 can also send a signal to a network controller (e.g., network controller 170 in FIG. 1) that is indicative of an unsuccessful installation of a software image on the access point 200 if the access point 200 does not receive a second validation data unit from the network controller in response to sending to the network controller a first validation data unit. In some instances, the validation module 222 can define a set of virtual clients such that each virtual client from the set of virtual clients can send a stream of data units to the network controller (e.g., network controller 170 in FIG. 1). In such instances, the set of virtual clients can be configured so that the number of virtual clients from the set of virtual clients is such that more than a threshold (e.g., fifty percent) of the computing resources of the access point are used.

Optionally, the processor 220 can also include a tunnel module 224 that can execute application processes and/or other modules, instructions, processes and/or functions associated with establishing and maintaining a tunnel such as, for example, an Ethernet-over-layer-3 tunnel such as a Control and Provisioning of Wireless Access Points (CAPWAP) tunnel, a Multiprotocol Label Switching (MPLS) tunnel, and/or the like. For example, the tunnel module 224 can be responsible for the encapsulation and decapsulation of incoming and/or outgoing data units passing through a tunnel defined between the network controller (e.g., network controller 170 in FIG. 1) and the access point 200.

Access point 200 can communicate with a (wireless) client device (e.g., a Wi-Fi® enabled laptop, a mobile phone, etc.) using any suitable wireless communication technology (or standard) such as, for example, Wi-Fi®, Bluetooth®, and/or the like. Specifically, access point 200 can be configured to receive data units and/or send data units through the RF transceiver 250, when communicating with a wireless client device. In some configurations, the access point 200 can use a first wireless communication standard to wirelessly communicate with a first wireless client device operatively coupled to the access point 200. Furthermore, the access point 200 can use a second wireless communication standard to wirelessly communicate with a second wireless client device operatively coupled to the access point 200. For example, access point 200 can send data units through the RF transceiver 250 to a first wireless client device (e.g., a Wi-Fi® enabled laptop and not shown in FIG. 2) based on the Wi-Fi® standard, and access point 200 can send data units from the RF transceiver 250 to a second wireless client device (e.g., a Bluetooth®-enabled mobile phone not shown in FIG. 2) based on the Bluetooth® standard.

In some configurations, access point 200 can be operatively coupled to a wired network device or network node such as, for example, an access network node by implementing a wired connection between communications interface 260 of the access point 200 and the communications interface of the wired network device or network node. The wired connection can be, for example, twisted-pair electrical signaling via electrical cables, fiber-optic signaling via fiber-optic cables, and/or the like. In such configurations, access point 400 can receive data units and/or send data units through the communications interface 260 that is connected to the communications interface of the wired network node, when access point 200 is communicating with the wired network device or network node.

The virtual clients 230 and/or 240 can be software module(s) or software client device(s) that are implemented in at least one of a memory 210 or a processor 220 of the access point 200 (e.g., stored in memory, executed on a processor, or implemented in firmware of the access point, etc.). FIG. 2 shows the access point 200 having two virtual clients 230 and/or 240 as an example only, and not by limitation. In other implementations or configurations, the access point 200 can include more than two virtual clients where each virtual client can communicate with the other virtual client either through the network to which the access point 200 is connected or through a pathway that excludes the network.

The virtual clients 230 and/or 240 can be defined or generated by the processor 220 of the access point 200 in response to the installation of a software image on the access point 200. The virtual client 230 and/or 240 can initiate a Dynamic Host Configuration Protocol (DHCP) request such that the virtual client 230 and/or 240 can communicate via the network. The DHCP request can include a request to acquire configuration data such as, for example, an internet protocol (IP) address, a default route, and one or more Domain Name System (DNS) server addresses from a DHCP server. The DHCP request can be sent from the virtual client 230 and/or 240 to the network controller via the network either through a tunnel or not through tunnel. In some instances, the DHCP server can be directly coupled to the network controller. In some other instances, the DHCP server can be operatively coupled to the network controller through intervening node(s) and/or network(s). In such instances, the network controller can communicate with the DHCP server to retrieve the requested configuration data for the virtual clients 230 and/or 240 such as, for example, an IP address, a subnet address, a gateway address, and/or other IP configuration information that can be used to configure the virtual clients 230 and/or 240. Once the configuration process is complete, the virtual clients 230 and/or 240 are able to communicate via the network.

In some instances, the virtual client 230 or 240 can send a validation data unit via a network (e.g., network 120 in FIG. 1) to the network controller (e.g., network controller 170 in FIG. 1). In other instances, the virtual client 230 can send a validation data unit to the virtual client 240 (or vice-versa) via the network and the network controller. The virtual client 230 can also send a validation data unit to the virtual client 240 (or vice-versa) via a path that can exclude the network. In some instances, the first validation data unit can be a ping, where a ping is a computer network administration utility used to test the ability to communicate with a device on an Internet Protocol (IP) network and to measure the round-trip time for data units (or messages) sent from the originating host device to a destination device. Ping can operate by sending Internet Control Message Protocol (ICMP) echo request packets to the destination device and waiting for an ICMP response. In the process, ping can measure the time from transmission to reception (round-trip time) and can record any packet loss. The results of the test can be printed in the form of a statistical summary of the response packets received, including the minimum, maximum, and the mean round-trip times, and in some instances, the standard deviation of the mean.

In some instances, the access point 200 can receive from a network controller via a network, an indication of a network fault (e.g., a signal representing a network fault). In such instances, the access point 200 can define, in response to the indication, a virtual client 230 or 240 disposed on the access point 200 that can send to the network controller, a first validation data unit. The first validation data unit, if successfully received by the network controller, can cause the network controller to send a second validation data unit to the access point 200. If the access point 200 receives the second validation data unit in response to the first validation data unit, the access point 200 can send a signal indicative of a receipt of the second validation data unit to the network controller.

Figure 3:
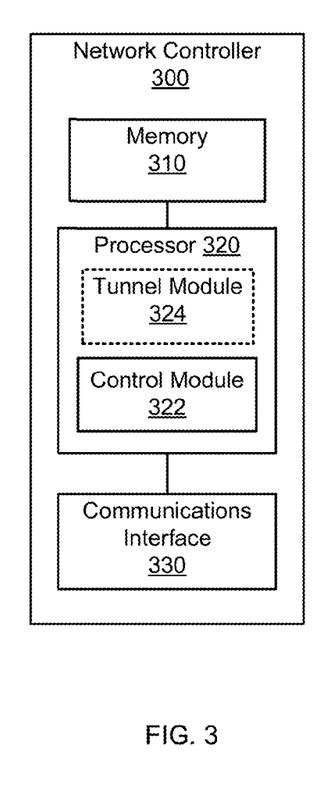
FIG. 3 is a system block diagram of a network controller, according to an embodiment.

FIG. 3 is a system block diagram of a network controller 300, according to an embodiment. Similar to the network controller 170 shown in FIG. 1, network controller 300 can be a host machine such as for example, a web server, an application server, a proxy server, a telnet server, and/or a file transfer protocol (FTP) server that can automatically validate network sessions and provide session management for distributed access points. As shown in FIG. 3, the network controller 300 includes a memory 310, a processor 320 that includes a control module 322 and optionally (as denoted by the dotted box) a tunnel module 324, and a communications interface 330. Each of these components of the network controller 300 is operatively coupled to the other components of the network controller 300. Operations of the communications interface 330 (e.g., transmit/receive data units), the tunnel module 324 (e.g., encapsulate/decapsulate data units), and the control module 322 (e.g., validate a network session and/or manage distributed access points), or any other portion of the memory 310, can be controlled by the processor 320.

The memory 310 can be, for example, a random access memory (RAM), a memory buffer, a hard drive, a database, an erasable programmable read-only memory (EPROM), an electrically erasable read-only memory (EEPROM), a read-only memory (ROM), a flash memory, and/or so forth. The memory 310 can store data and instructions to cause the processor 320 to execute modules, processes and/or functions associated with the network controller 300. The memory 310 also can store data related to the management of the distributed access points in the enterprise network. In some instances, other data (e.g., data other than that used for managing distributed access points) can also be stored in the memory 310. For example, combinations of user IDs and passwords of registered users and media access control (MAC) addresses of wireless client devices can be stored in memory 310, such that the identity of a user of a client device and/or the client device can be verified by network controller 300 before a client device can successfully log into the network. Alternatively, the memory 310 can also store address information (such as the MAC address or the IP address) of an external or third-party server that stores user authentication information (e.g., user IDs and passwords) and related policy.

The processor 320 of the network controller 300 can be, for example, a general purpose processor, a Field Programmable Gate Array (FPGA), an Application Specific Integrated Circuit (ASIC), a Digital Signal Processor (DSP), and/or the like. The processor 320 is configured to run and/or execute processes and/or other modules, instructions, and/or functions associated with the network controller 300. The processor 320 includes a control module 322 and optionally (as denoted by the dotted box) a tunnel module 324. The tunnel module 324 can execute application processes and/or other modules, instructions, processes and/or functions associated with establishing and maintaining a tunnel such as, for example, an Ethernet-over-layer-3 tunnel such as a Control and Provisioning of Wireless Access Points (CAPWAP) tunnel, a Multiprotocol Label Switching (MPLS) tunnel, and/or the like. For example, the tunnel module 324 can be responsible for the encapsulation and decapsulation of outgoing and/or incoming data units passing through a tunnel defined between the network controller 300 and one or multiple access points via a network.

The processor 320 also includes a control module 322 that can receive a first validation data unit from an access point in response to the installation of a software image on the access point. The control module can generate a second validation data unit and send the second validation data unit to the access point (in response to receiving the first validation data unit) through the communication interface 330, where the second validation data unit is different from the first validation data unit. The control module 322 can also receive a signal from an access point that is indicative of a receipt of the second validation data unit. Additionally, the control module 322 can receive a signal from an access point that is indicative of the time value associated with an elapsed time between a first time associated with sending the first validation data unit by an access point and a second time associated with receiving the second validation data unit (sent by the network controller 300) by the access point.

In the event of a network failure, the control module 322 can generate a signal indicative of network failure and send the signal through the communication interface 330 to one or a set of access points. In some instances, network failures can include control plane failures, where the network control plane software fails leading to the loss of control of the data plane. In such instances, new network sessions cannot be established, and existing network sessions cannot be modified or terminated by the network controller 300. In IP networks, a control plane failure can include pollution or corruption of IP lookup tables on some routers. This can cause difficulty for the IP traffic on these routers (or nodes) to be forwarded. Similar situations can occur when viruses attack IP routers because viruses can disable the IP networks through disabling IP network control plane. In other instances, network failures can include subnetwork failure. Subnetwork failures can occur within a regional subnetwork that commonly shares a risk such as, for example, a region that has high frequency of earthquakes. In addition, other natural disasters such as flooding and/or tsunamis, etc., can also disable a regional subnetwork. In yet other instances, network failures can include failures due to accidents at a network operational center, such as power shutdown due to fire, flooding, etc.

In response to the signal indicative of network failure, the control module 322 can receive a first validation data unit from an access point. The control module 322 can generate a second validation data unit in response to the first validation data unit and send the second validation data unit to the access point through the communications interface 330. The control module 322 can also receive a signal from the access point indicative of a receipt of the second validation data unit if the access point successfully receives the second validation data unit. The control module 322 can also receive a signal from the access point indicative of a failure of receipt of the second validation data unit if the access point does not receive the second validation data unit.

The control module 322 can also receive DHCP requests from the virtual clients disposed within an access point and can obtain the desired configuration information (or data) requested in the DHCP request from a DHCP server either directly coupled to the network controller 300 or operatively coupled to the network controller 300 through intervening node(s) and/or network(s). The control module 322 can then send a signal representing the requested configuration information (or data) to the virtual clients via the network. Once the validation data units generated in response to the installation of a new software image on an access point or a set of access points (e.g., the first validation data unit generated at the access point and the second validation data unit generated at the network controller 300) have been successfully sent back and forth between the access point and the network controller, the control module 322 can receive a verification signal from the access point (or the set of access points) that is indicative of the successful installation of the new software image on the access point (or the set of access points).

In some configurations, the processor 322 can also include a (network) session management module and a node management module (not shown in FIG. 3) that can execute application processes and/or other modules, instructions, processes and/or functions associated with establishing and maintaining network sessions with various access points and/or virtual clients disposed within the access points. Additionally, the session management module and the node management module can track the amount of bandwidth consumed in each network session with an access point and/or a virtual client, can allocate the appropriate bandwidth for new network sessions established with virtual clients and/or access points, can allocate new ports for establishing new network sessions with new virtual clients disposed within new access points, can associate the ports in the network controller with the MAC address or IP address of the different access points (or nodes) in active session with the network controller, and/or the like.

The communications interface 330 of the network controller 300 can include, for example, at least two ports (not shown in FIG. 3) that can be used to implement one or more wired connections between the network controller 300 and one or more wired network nodes (e.g., aggregation network node, access network node, core network node, and/or devices in other networks, etc.). The wired connections can be, for example, twisted-pair electrical signaling via electrical cables, fiber-optic signaling via fiber-optic cables, and/or the like. As such, the network controller 300 can be configured to receive data units and/or send data units through one or more ports of the communications interface 330, which are connected to the communications interfaces of one or more wired network nodes, and/or devices in other networks. Furthermore, in some configurations, network controller 300 can implement one wired connection (e.g., twisted-pair electrical signaling) with one wired network node, or a device in another network that is operatively coupled to the network controller 300 through one port of the communications interface 330, while implementing a different wired connection (e.g., fiber-optic signaling) with another wired network node or a device in another network that is operatively coupled to the network controller 300 through another port of the communications interface 330. The network controller 300 receives the different validation data units sent from one or multiple access points via the different ports of the communication interface 330. Additionally, the network controller 300 sends all validation data units to the different access points through the communication interface 330.

Figure 4:
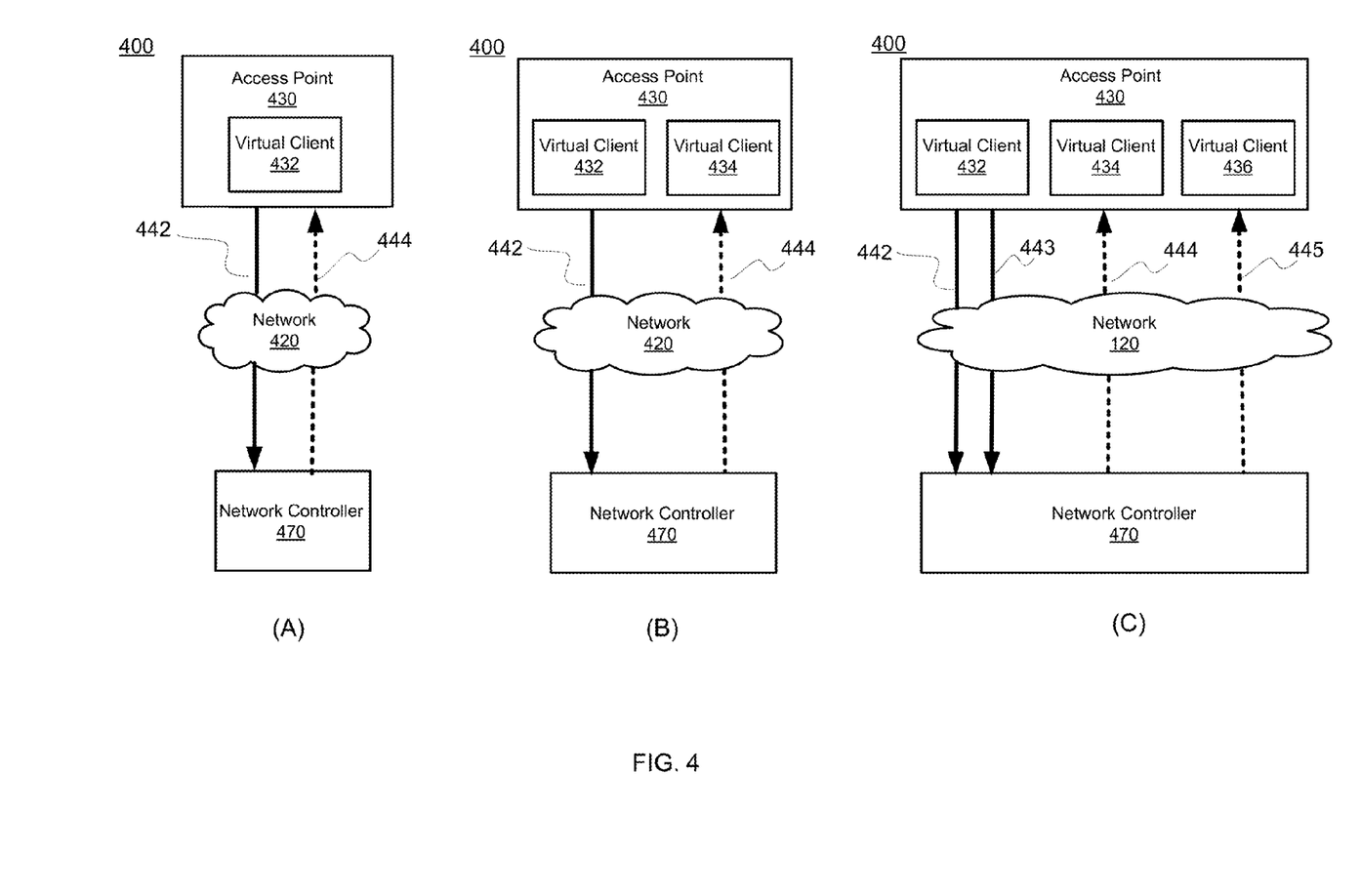
FIGS. 4A-C shows different configurations for virtual clients disposed in an access point to send and receive validation data units via a network controller to test for end-to-end connectivity and session establishment.

FIGS. 4A-C shows the different examples for virtual clients disposed in an access point to send and receive validation data units via a network controller to test for end-to-end connectivity and session establishment. In the example 400 shown in FIG. 4A, an access point 430 includes one virtual client 432. Upon installation of a second software image (or a newer version software image) on the access point 430, the access point 430 can define a virtual client 432 disposed in the access point 430.

Prior to beginning any communication, the virtual client 432 can initiate a Dynamic Host Configuration Protocol (DHCP) request to a DHCP server (not shown in FIGS. 4A-C) so that the virtual client 432 can send and/or receive data units via the network 420. The DHCP request can include a request to acquire configuration information (or data) such as, for example, an internet protocol (IP) address, a default route, and one or more Domain Name System (DNS) server addresses from a DHCP server. The DHCP request can be sent from the virtual client 432 to the network controller 470 via the network 420 as described above. The network controller 470 can communicate with the DHCP server as described above and retrieve the requested configuration data for the virtual client 432 such as, for example, an IP address, a subnet address, a gateway address, and/or other IP configuration information (or data) that can be used to configure the virtual client 432. Once the configuration process is complete, the virtual client 432 can send and/or receive data units via the network 420.

The virtual client 432 can send a first validation data unit to the network controller 470 via the network 420 as seen by the bold solid arrow 442. In some instances, the first validation data unit can be sent wirelessly via the RF transceiver of the access point 430 (e.g., RF transceiver 250 in FIG. 2) to an intermediate wireless network node or device in the network 420. In other instances, the first validation data unit can be sent through a wired pathway via the communications interface of the access point 430 (e.g., communications interface 260 in FIG. 2) to an intermediate wired network node or device in the network 420. As described above, the first validation data unit can be a ping that can be used to test the ability to establish contact or communicate with a destination device, for example, the network controller 470, and to measure the round-trip time for data units (or messages) sent from the originating host device (access point 430) to a destination device (network controller 470). As described above, the first validation data unit can be sent from the access point 430 to the network controller 470 either through a tunnel or not through a tunnel (via the network 420).

In some instances, the network controller 470 can successfully receive the first validation data unit (from an intermediate network node within the network 420) via a port of the communications interface (e.g., communications interface 330 in FIG. 3). In such instances, the network controller can define or generate a second validation data unit in response to receiving the first validation data unit. The network controller 470 can send the second validation data unit to the virtual client 432 associated with the access point 430 via the network 420 as seen by the dotted arrow 444. If the access point 430 successfully receives the second validation data unit, the access point 430 can generate and send a signal to the network controller that is indicative of the successful installation of the second software image (or the newer version software image) on the access point 430. Successful receipt of the second validation data unit at the access point 430 indicates the connectivity between the access point 430 and the network controller 470 is of optimal or acceptable quality. If the access point 430 does not receive the second validation data unit, the access point 430 can uninstall the second software image (or the newer version software image), and install the first software image (or the older version software image) on the access point 430. Additionally, the access point 430 can also generate and send a signal to the network controller 470 that is indicative of the unsuccessful installation of the second software image on the access point 430. Not receiving of the second validation data unit at the access point 430 indicates the connectivity between the access point 430 and the network controller 470 is either broken or is of unacceptable quality.

Additionally, as mentioned above, if the validation data units are ping packets, the mean round trip time elapsed between sending the first validation data unit from the access point and receiving the second validation data unit at the access point can be measured and an indication of the mean round trip time can be included in the validation data unit received by the access point 430. If the mean round trip time is smaller than a set predetermined value, the network connectivity can be classified as strong or acceptable. If the mean round trip time is greater than the predetermined value, the network connectivity can be classified as broken or unacceptable.

In some instances, the first validation data unit sent from the access point 430 to the network controller 470 either may not be received by the network controller 470 or may be received by the network controller 470 after a predetermined time period. In such instances, the network controller 470 can generate or define a signal indicative of a broken or unacceptable connectivity between the network controller 470 and the access point 430, and send the signal to the access point. In such instances, upon receipt of the signal from the network controller 470, the access point 430 can uninstall the second software image (or the newer version software image) from the access point 430, and install the first software image (or the older version software image) on the access point 430. In other instances, the signal generated by the network controller 470 indicative of unacceptable network connectivity may not be received by the access point or may be received by the access point after a predetermined time period. In such instances, the access point 430 can also uninstall the second software image (or the newer version software image) from the access point 430, and install the first software image (or the older version software image) on the access point 430.

In some instances, the access point 430 (or multiple access points not shown in FIGS. 4A-C) can receive from the network controller 470 a signal that is indicative of a network fault via the network 420. Examples of network fault are provided in the discussion above. The signal indicative of a network fault can be initiated by, for example, a network administrator. In such instances, the access point 430 can define or generate a virtual client 432 in response to the indication of network failure. Prior to beginning any communication, the virtual client 432 can initiate a Dynamic Host Configuration Protocol (DHCP) request to a DHCP server to receive an IP address and other configuration data such that the virtual client 432 can send and/or receive data units via the network 420 as described above. The virtual client 432 can send to the network controller 470 a first validation data unit via the network 420. Successful receipt of the first validation data unit by the network controller 470 will cause the network controller 470 to generate or define one or multiples copies of a second validation data unit. The network controller 470 can send the second validation data unit to the access point 430 (or multiple access points not shown in FIGS. 4A-C) via the network 420.

If the access point 430 receives the second validation data unit in response to the first validation data unit, the access point 430 can send to the network controller 470 a signal indicative of a receipt of the second validation data unit. If the access point 430 does not receive the second validation data unit in response to the first validation data unit, the access point 430 can send to the network controller 470 a signal indicative of a failure of receipt of the second validation data unit. If an access point 430 from a set of access points does not receive a copy or instance of the second validation data unit from the network controller 470, then the network fault can result with problems associated with the access point 430 such as, for example, problems with the RF transceiver of the access point 430 or problems with the antenna of the access point 430. If all access points from the set of access points fail to receive copies or instances of the second validation data unit from the network controller 470, the network fault can either be associated with the network controller 470 and/or any of the intermediate devices in the network 420.

In the example 400 shown in FIG. 4B, an access point 430 includes two virtual clients 432 and 434. Upon installation of a second software image (or a newer version software image) on the access point 430, the access point 430 can define a first virtual client 432 and a second virtual client 434 disposed in the access point 430. Prior to beginning communication with network 420, the virtual clients 432 and 434 can initiate a Dynamic Host Configuration Protocol (DHCP) request to a DHCP server to receive IP addresses and other configuration data such that the virtual clients 432 and 434 can send and/or receive data units via the network 420 as described above in connection with FIG. 4A. Once the configuration process is complete, the first virtual client 432 can send a first validation data unit to the second virtual client 434 via the network 420 as seen by the bold solid arrow 442. In some instances, the first validation data unit can be sent wirelessly via the RF transceiver of the access point 430 (e.g., RF transceiver 250 in FIG. 2) to an intermediate wireless network node or device in the network 420. In other instances, the first validation data unit can be sent through a wired pathway via the communications interface of the access point 430 (e.g., communications interface 260 in FIG. 2) to an intermediate wired network node or device in the network 420.

As described above, the first validation data unit can be sent from the first virtual client 432 of the access point 430 to the network controller 470 either through a tunnel or not through a tunnel (via the network 420). As described above, the first validation data unit can be, for example, a ping that can be used to test the ability to establish contact or communicate with a target device, for example, an enterprise network and to measure the round-trip time for messages (e.g., data units) sent from the originating host device to a destination device.

In some instances, the network controller 470 can successfully receive the first validation data unit (from an intermediate network node within the network 420) via a port of the communications interface as described above. In such instances, the network controller 470 can define or generate a second validation data unit in response to receiving the first validation data unit. The network controller 470 can send the second validation data unit to the virtual client 434 associated with the access point 430 via the network 420 as seen by the dotted arrow 444. If the second virtual client 434 in the access point 430 successfully receives the second validation data unit, the access point 430 can generate and send a signal to the network controller 470 that is indicative of the successful installation of the second software image (or the newer version software image) on the access point 430. This is because successful receipt of the second validation data unit at the second virtual client 434 in the access point 430 indicates the connectivity between the access point 430 and the network controller 470 is acceptable or of optimal quality. If the second virtual client 434 in the access point 430 does not receive the second validation data unit, the access point 430 can uninstall the second software image (or the newer version software image), and install the first software image (or the older version software image) on the access point 430. Additionally, the access point 430 can also generate and send a signal to the network controller 470 that is indicative of the unsuccessful installation of the second software image on the access point 430. This is because not receiving the second validation data unit at the second virtual client 434 in the access point 430 indicates the connectivity between the access point 430 and the network controller 470 is either broken or is of unacceptable quality.

Additionally, as mentioned above, if the validation data units are ping packets, the mean round trip time elapsed between sending the first validation data unit from the first virtual client 432 and receiving the second validation data unit at the second virtual client 434 can be measured and included in the second validation data unit received by the second virtual client 434. If the mean round trip time is less than a predetermined value, the network connectivity can be classified as strong or acceptable. If the mean round trip time is greater than a predetermined value, the network connectivity can be classified as broken or of unacceptable quality.

In some instances, the first validation data unit sent from the first virtual client 432 in the access point 430 to the network controller 470 can either not be received by the network controller 470 or can be received by the network controller 470 after a predetermined time period. In such instances, the network controller 470 can generate or define a signal indicative of a broken or unacceptable connectivity between the network controller 470 and the access point 430. In such instances, upon receipt of the signal (indicative of unacceptable or broken connectivity between the access point and the network controller) from the network controller 470, the access point 430 can uninstall the second software image (or the newer version software image) from the access point 430, and install the first software image (or the older version software image) on the access point 430. In other instances, the signal generated and sent by the network controller 470 that is indicative of unacceptable network connectivity may not be received by the access point 430 or may be received by the access point 430 after a predetermined time period. In such instances, the access point 430 can also uninstall the second software image (or the newer version software image) from the access point 430, and install the first software image (or the older version software image) on the access point 430.

In some instances, the access point 430 (or multiple access points not shown in FIGS. 4A-C) can receive from the network controller 470 a signal(s) that is indicative of a network fault via the network 420. Examples of network fault are provided in the discussion above. The signal(s) indicative of network fault can be initiated by, for example, a network administrator. In such instances, the access point 430 can define or generate a first virtual client 432 and a second virtual client 434 in response to the indication of network failure. Prior to beginning communication with network 420, the first virtual client 432 and the second virtual client 434 can initiate a Dynamic Host Configuration Protocol (DHCP) request to a DHCP server to receive an IP address and other configuration data such that the first virtual client 432 and the second virtual client 434 can send and/or receive data units via the network 420 as described above. The first virtual client 432 can send a first validation data unit to the second virtual client 434 via the network 420 and the network controller 470 (and/or vice-versa). Successful receipt of the first validation data unit by the network controller 470 will cause the network controller 470 to generate or define a second validation data unit (or multiples copies or instances of a second validation data unit).

The network controller 470 can send the second validation data unit to the second virtual client 434 in the access point 430 (or multiple access points not shown in FIGS. 4A-C) via the network 420. If the second virtual client 434 in the access point 430 receives the second validation data unit in response to the first validation data unit, the access point 430 can send to the network controller 470 a signal indicative of a receipt of the second validation data unit. If the second virtual client 434 in the access point 430 does not receive the second validation data unit in response to the first validation data unit, the access point 430 can send to the network controller 470 a signal indicative of a failure of receipt of the second validation data unit.

If an access point 430 out of a set of access points does not receive a copy or instance of the second validation data unit from the network controller 470, then the network fault can result from problems associated with the access point 430 such as, for example, problems with the RF transceiver of the access point or problems with the antenna of the access point 430. If all of the access points from the set of access points fail to receive copies or instances of the second validation data unit from the network controller 470, the network fault can either be associated with the network controller 470 and/or any of the intermediate devices in the network 420. Note that in the discussion of FIG. 4B thus far, the first virtual client 432 sends the first validation data unit to the second virtual client 434 by way of example only, and not by limitation. In other configurations, the second virtual client 434 can send a first validation data unit to the first virtual client 432 via the network 420 and the network controller 470. In yet other configurations, each virtual client 432 and 434 can send a separate validation data packet substantially simultaneously to the other virtual client 434 and 432 via the network 420 and the network controller 470.

In the example shown in FIG. 4C, an access point 430 includes three virtual clients 432, 434 and 436. Upon installation of a second software image (or a newer version software image) on the access point 430, the access point 430 can define a first virtual client 432, a second virtual client 434 and a third virtual client 436 disposed in the access point 430. Prior to beginning communication with network 420, the virtual clients 432, 434 and 436 initiates a Dynamic Host Configuration Protocol (DHCP) request to a DHCP server to receive IP addresses and other configuration data such that the virtual clients 432, 434 and 436 can send and/or receive data units via the network 420 as described above for the case of FIGS. 4A-B. Once the configuration process is complete, the first virtual client 432 can send a first copy or instance of a first validation data unit to the second virtual client 434 via the network 420 and the network controller 470 as seen by the bold solid arrow 442, and a second copy or instance of the first validation data unit to the third virtual client 436 via the network 420 and the network controller 470 as seen by the bold solid arrow 443.

In some instances, the first copy and the second copy of the first validation data unit can be sent wirelessly via the RF transceiver of the access point 430 to an intermediate wireless network node or device in the network 420. In other instances, the first copy and the second copy of the first validation data unit can be sent through a wired pathway via the communications interface of the access point 430 to an intermediate wired network node or device in the network 420. In yet other instances, the first copy of the first validation data unit can be sent wirelessly via the RF transceiver of the access point 430 to an intermediate wireless network node or device in the network 420, and the second copy of the first validation data unit can be sent through a wired pathway via the communications interface of the access point 430 to an intermediate wired network node or device in the network 420 (or vice-versa).

As described above, the first copy and the second copy of the first validation data unit can either both be sent from the first virtual client 432 in the access point 430 to the network controller 470 either through a tunnel, or both copies can be sent without a tunnel (via the network 420), or one copy of the first validation data unit can be send via a tunnel and the other copy of the first validation data unit can be sent without a tunnel. As described above, the first validation data unit can be, for example, a ping that can be used to test the ability to establish contact or communicate with a destination device, for example, a network controller and to measure the round-trip time for messages (e.g., data units) sent from the originating host device (e.g., access point 430) to a destination device.

In some instances, the network controller 470 can successfully receive the first copy and the second copy of the first validation data unit (from an intermediate network node within the network 420) via the communications interface as described above. In such instances, the network controller 470 can define or generate a first copy and a second copy of a second validation data unit in response to receiving the first copy and the second copy of the first validation data unit. The network controller 470 can send the first copy of the second validation data unit to the virtual client 434 associated with the access point 430 via the network 420 as seen by the dotted arrow 444. The network controller 470 can send the second copy of the second validation data unit to the virtual client 436 associated with the access point 430 via the network 420 as seen by the dotted arrow 445.

If the second virtual client 434 and the third virtual client 436 in the access point 430 successfully receives the first copy and the second copy of the second validation data unit, respectively, the access point 430 can generate and send a signal to the network controller 470 that is indicative of the successful installation of the second software image (or the newer version software image) on the access point 430. Successful receipt of the first copy and the second copy of the second validation data unit at the second virtual client 434 and the third virtual client 436 in the access point 430, respectively, indicates the connectivity between the access point 430 and the network controller 470 is of optimal or acceptable quality. If either the second virtual client 434 in the access point 430 does not receive the first copy of the second validation data unit, or the third virtual client 436 in the access point 430 does not receive the second copy of the second validation data unit, or both the second virtual client 434 and the third virtual client 436 does not receive the first copy and the second copy of the second validation data unit, respectively, the access point 430 can uninstall the second software image (or the newer version software image), and install the first software image (or the older version software image) on the access point 430. Additionally, the access point 430 can also generate and send a signal to the network controller 470 that is indicative of the unsuccessful installation of the second software image on the access point 430. Not receiving the second validation data unit at either the second virtual client 434 or the third virtual client 436 in the access point 430 indicates the connectivity between the access point 430 and the network controller 470 is either broken or is of unacceptable quality.

In other instances, either the first copy or the second copy or both copies of the first validation data unit sent from the first virtual client 432 in the access point 430 to the network controller 470 can either not be received by the network controller 470 or can be received by the network controller 470 after a predetermined time period. In such instances, the network controller 470 can generate or define a signal indicative of broken or unacceptable connectivity between the network controller 470 and the access point 430. In such instances, upon receipt of the signal from the network controller 470, the access point 430 can uninstall the second software image (or the newer version software image) from the access point 430, and install the first software image (or the older version software image) on the access point 430. In other instances, the signal generated and sent by the network controller 470 that is indicative of unacceptable network connectivity may not be received by the access point 430 or may be received by the access point 430 after a predetermined time period. In such instances, the access point 430 can also uninstall the second software image (or the newer version software image) from the access point 430, and install the first software image (or the older version software image) on the access point 430.

In some instances, the access point 430 (or multiple access points not shown in FIGS. 4C) can receive from the network controller 470 a signal(s) that is indicative of a network fault via the network 420. Examples of network fault are provided in the discussion above. The signal(s) indicative of network fault can be initiated by, for example, a network administrator. In such instances, the access point 430 can define or generate a first virtual client 432, a second virtual client 434 and a third virtual client 436 in response to the indication of network failure. Prior to beginning communication with network 420, the first virtual client 432, the second virtual client 434 and the third virtual client 436 can initiate a Dynamic Host Configuration Protocol (DHCP) request to a DHCP server to receive an IP address and other configuration data such that the first virtual client 432, the second virtual client 434 and the third virtual client 436 can send and/or receive data units via the network 420 as described above. The first virtual client 432 can send a first copy or instance of a first validation data unit to the second virtual client 434 via the network 420 and the network controller 470, and a second copy or instance of the first validation data unit to the third virtual client 436 via the network 420 and the network controller 470.

In some instances, the network controller 470 can successfully receive the first copy and the second copy of the first validation data unit via the network 420 as described above. In such instances, the network controller 470 can define or generate a first copy and a second copy of a second validation data unit in response to receiving the first copy and the second copy of the first validation data unit. The network controller 470 can send the multiple copies of the second validation data unit to the second virtual client 434 and the third virtual client 436 in the access point 430 (or multiple access points not shown in FIGS. 4A-C) via the network 420. If the second virtual client 434 and the third virtual client 436 in the access point 430 receives the first copy and the second copy of the second validation data unit, respectively, in response to the first validation data unit, the access point 430 can send to the network controller 470 a signal indicative of a receipt of the second validation data unit. If either the second virtual client 434 in the access point 430, or the third virtual client 436 in the access point 430, or both the second virtual client 434 and the third virtual client 436 in the access point 430 do not receive a copy of the second validation data unit in response to the first validation data unit, the access point 430 can send to the network controller 470 a signal indicative of a failure of receipt of the second validation data unit.

If an access point 430 out of a set of access points generates a signal indicative of a failure of a receipt of the second validation data unit, then the network fault can result from problems associated with the access point 430 such as, for example, troubles with the RF transceiver of the access point and/or problems with the antenna of the access point 430. If all of the access points from the set of access points generates a signal indicative of a failure of receipt of the second validation data unit, the network fault can either be associated with the network controller 470 and/or any of the intermediate devices (or network nodes) in the network 420.

Note that in the discussions of FIG. 4C thus far, the first virtual client 432 sends a first copy and a second copy of the first validation data unit to the second virtual client 434 and the third virtual client 436 by way of example only, and not by limitation. In other examples, the second virtual client 434 can send a first copy and a second copy of the first validation data unit to the first virtual client 432 and the third virtual client 436 via the network 420 and the network controller 470. In yet other examples, each virtual client 432, 434 and 436 can send copies of separate validation data units substantially simultaneously to the other virtual clients via the network 420 and the network controller 470. Note also that in the discussions of FIG. 4C thus far, three virtual clients were included by way of example only, and not by limitation. In other examples, multiple virtual clients (in excess of three virtual clients) can be defined in an access point and each virtual client can send a copies of a validation data unit to either a random number of other virtual clients or to a pre-defined set of other virtual clients. For example, in some instances, an access point can define eight virtual clients disposed in the access point in response to installing a new software image. In such instances, virtual client 1 can be configured to send a copy or instance of a validation data unit to virtual client 2 and virtual client 3, while virtual client 2 can be configured to send a copy or instance of a validation data unit to virtual client 4 and virtual client 5, while virtual client 3 can be configured send a copy or instance of a validation data unit to virtual client 6, virtual client 7 and virtual client 8, and/or the like.

In addition to the different configurations for the network controller to test for end-to-end connectivity and session establishment as described in FIG. 4A-C, in some configurations, the network controller can also initiate on-demand diagnostic requests to virtual client(s) disposed within the different access point(s) at, for example, periodic, substantially periodic, or random time intervals or at the request of a network administrator. In such configurations, the network controller can send validation data unit(s) to the access point(s). The access point(s) can, in response to receiving the validation data unit(s) from the network controller define one or multiple virtual client(s) disposed within the access point(s). In some instances, the network controller can receive from the virtual client(s) disposed within the access point(s), in response to the validation data unit(s), a response signal(s) indicative of receipt of the validation data unit(s) within a set pre-determined time period. In such instances, the network connection between the network controller and the access point(s) can be classified as strong or acceptable. In other instances, the network controller may not receive a response signal(s) from the virtual client(s) disposed within the access point(s) or may receive a response signal(s) after the set pre-determined time period. In such instances, the network connectivity between the access point(s) and the network controller can be classified as broken or unacceptable. In yet other instances, the validation data unit(s) sent from the network controller can allow the virtual client(s) disposed within the access point(s) to ping various IP addresses to diagnose virtual client(s) and/or client device(s) connectivity problems. This feature can provide, for example, network administrators, network developers and network operators with a powerful tool to diagnose or debug virtual client(s), access point(s) or client device(s) connectivity problems by executing the same type of commands as used in Windows operating systems such as, for example, ping, ipconfig, tracert, arp, and/or the like.

Figure 5:
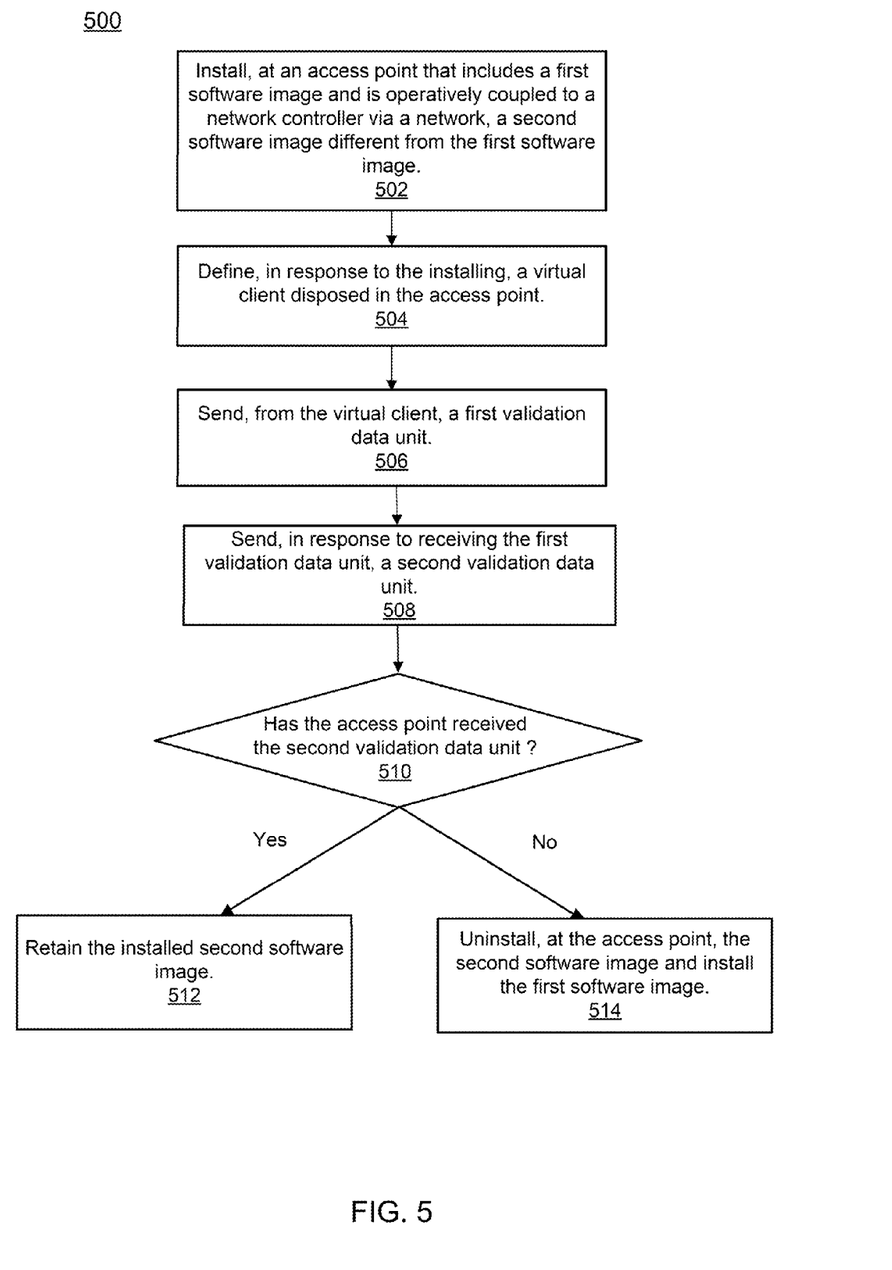
FIG. 5 is a flow chart illustrating a method for installing a second software image in an access point that includes a first software image, according to an embodiment.

FIG. 5 is a flow chart illustrating a method 500 for installing a second software image in an access point that includes a first software image, according to an embodiment. The method 500 includes installing at, for example, an access point that includes a first software image and is operatively coupled to a network controller via a network, a second software image different from the first software image, at 502. As described above, the first software image and the second software image can be different versions of a program such as, for example, an operating system. The second software image can be received by the access point from, for example, a network controller and can be installed at an access point by, for example, a processor associated with the access point.

At 504, a virtual client is defined at, for example, the access point in response to installing the second software image. The virtual client can be defined or generated by the processor of the access point and is disposed in the access point. The virtual client can be, for example, a software module or software client device that is implemented in at least one of a memory or a processor of the access point (e.g., stored in memory, executed on a processor, or implemented in firmware of the access point, etc.). As described above, the virtual client can initiate a DHCP request such that the virtual client can communicate via the network. The DHCP request can include a request to acquire configuration data such as, for example, an internet protocol (IP) address, a default route and one or more Domain Name System (DNS) server addresses from a DHCP server. The DHCP request can be sent from the virtual client to the network controller. In some instances, the DHCP server can be directly coupled to the network controller. In other instances, the DHCP server can be operatively coupled to the network controller through intervening node(s) and/or network(s). In such instances, the network controller can communicate with the DHCP server to retrieve the requested configuration information for the virtual client such as, for example, an IP address, a subnet address, a gateway address, and/or other IP configuration information (or data) that can be used to configure the virtual client. Once the configuration process is complete, the virtual client is able to communicate via the network.

At 506, a first validation data unit is defined by, for example, the virtual client, and the first validation data unit is sent to the network controller. As described above, in some instances, the first validation data unit can be a ping, where a ping is a computer network administration utility used to test the ability to connect with a device on an Internet Protocol (IP) network and to measure the round-trip time for data units (or messages) sent from an originating host device (the access point) to a destination device (the network controller). As described above, a ping can operate by sending Internet Control Message Protocol (ICMP) echo request packets to the target device and waiting for an ICMP response. In the process, ping can measure the time from transmission to reception (round-trip time) and can record any packet loss.

At 508, a second validation data unit is defined at, for example, the network controller in response to receiving the first validation data unit, and the second validation data unit is sent to the access point. As described above, the network controller can be a host machine such as for example, a web server, an application server, a proxy server, a telnet server, and/or a file transfer protocol (FTP) server that can automatically validate network sessions and provide session management for distributed access points. The network controller can store data and instructions to execute modules, processes and/or functions associated with the management of the distributed access points in the enterprise network.

At 510, a verification method can be implemented to confirm whether the access point is has received the second validation data unit. If the access point successfully receives the second validation data unit within a set predetermined time period, the network connectivity between the virtual client and the network controller is determined to be of optimal or acceptable quality. In such instances, the installed second software image is determined to be functioning optimally (or acceptably) and is retained in the access point, at 512. If the access point does not receive the second validation data unit or if the access point receives the second validation data unit after a set predetermined time period, the network connectivity between the virtual client and the network controller is determined to be broken or of unacceptable quality. In such instances, the installed second software image is determined not to be functioning properly and the second software image is uninstalled in the access point, and the first software image is re-installed in the access point, at 514.

Figure 6:
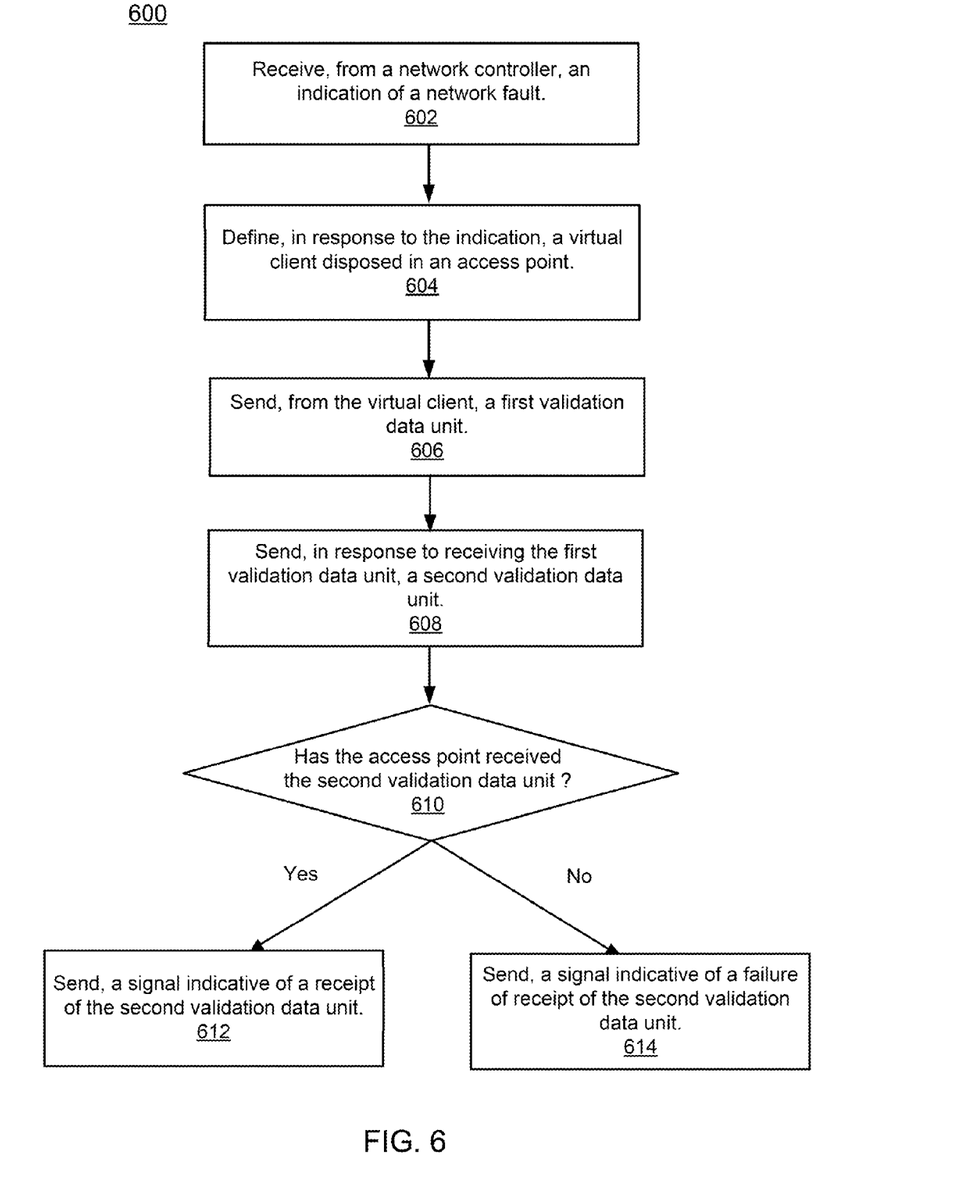
FIG. 6 is a flow chart illustrating a method for detecting whether a reported network fault is associated with an access point, according to an embodiment.

FIG. 6 is a flow chart illustrating a method 600 for detecting whether a reported network fault is associated with an access point, according to an embodiment. The method 600 includes receiving from a network controller an indication of a network fault, at 602. As described above, in some instances, network failures can include control plane failures, where the network control plane software fails leading to the loss of control of the data plane. In such instances, new network sessions cannot be established, and existing network sessions cannot be modified or terminated by the network controller. A similar situation can also occur when viruses attack IP routers as viruses can disable the IP networks through disabling the IP network control plane. In other instances, network failures can include a subnetwork failure that can occur within a regional subnetwork that commonly share a risk such as, for example, a region that has high frequency of earthquakes. In addition, other natural disasters such as flooding and/or tsunamis, etc. can also disable a regional subnetwork.

At 604, a virtual client is defined at, for example, the access point in response to receiving the indication of a network fault. The virtual client can be defined or generated by the processor of the access point and is disposed in the access point. As described above, the virtual client can be, for example, a software module or software client device that is implemented in at least one of a memory or a processor of the access point (e.g., stored in memory, executed on a processor, or implemented in firmware of the access point, etc.). As described above, the virtual client can initiate a DHCP request such that the virtual client can communicate via the network. The DHCP request can include a request to acquire configuration data such as, for example, an internet protocol (IP) address, a default route and one or more Domain Name System (DNS) server addresses from a DHCP server. The DHCP request can be sent from the virtual client to the network controller. The network controller can communicate with a DHCP server to retrieve the requested configuration data for the virtual client such as, for example, an IP address, a subnet address, a gateway address, and/or other IP configuration information that can be used to configure the virtual client. Once the configuration process is complete, the virtual client is able to communicate via the network.

At 606, a first validation data unit is defined by, for example, the virtual client, and the first validation data unit is sent to the network controller. As described above, in some instances, the first validation data unit can be a ping that can be used to test the ability to connect with a device on an Internet Protocol (IP) network and to measure the round-trip time for data units (or messages) sent from an originating host device (which in this case is the access point) to a destination device. Operation of the ping has been described in detail above.

At 608, a second validation data unit is defined at, for example, the network controller in response to receiving the first validation data unit, and the second validation data unit is sent to the access point. As described above, the network controller can be a host machine such as for example, a web server, an application server, a proxy server, a telnet server, and/or a file transfer protocol (FTP) server that can automatically validate network sessions and provide session management for distributed access points. The network controller can store data and instructions to execute modules, processes and/or functions associated with the management of the distributed access points in the enterprise network. In some instances, the network controller may not receive the first validation data unit from the access point or the network controller may receive the first validation data unit after a set predetermined time period. In such instances, the network connectivity between the access point and the network controller is determined to be broken or of unacceptable quality. In such instances, the network fault can be determined to occur from problems associated with the access point such as, for example, troubles with the RF transceiver of the access point and/or troubles with the antenna of the access point.

At 610, a verification method can be implemented to confirm whether the access point has received the second validation data unit. If the access point successfully receives the second validation data unit within a set predetermined time period, the network connectivity between the access point and the network controller is determined to be of acceptable quality. In such instances, the access point can send to the network controller a signal indicative of a receipt of the second validation data unit, at 612. In such instances, the network fault is not associated with the access point and can either be associated with the network controller and/or any of the intermediate devices in the network. If the access point does not receive the second validation data unit from the network controller or if the access point receives the second validation data unit after a set predetermined time period, the network connectivity between the virtual client and the network controller is determined to be broken or of unacceptable quality. In such instances, the network fault can be determined to occur from problems associated with the access point such as, for example, problems with the RF transceiver of the access point or problems with the antenna of the access point.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
    installing, at an access point that (1) includes a first software image and (2) is operatively coupled to a network controller via a network, a second software image different from the first software image;
    defining, in response to the installing and at the access point, a virtual client configured to send, at a first time and to the network controller via the network, a first validation data unit that causes the network controller to send a second validation data unit to the access point;
    sending, to the network controller, a signal indicative of a successful receipt of the second validation data unit if the virtual client receives the second validation data unit at a second time after the first time, the signal indicative of the successful receipt of the second validation data unit being indicative of a time value associated with an elapsed time between the first time and the second time; and
    sending, to the network controller, a signal indicative of a failure of a receipt of the second validation data unit if the virtual client does not receive the second validation unit from the network controller.

2. The method of claim 1, wherein the second validation data unit is different than the first validation data unit.

3. The method of claim 1, further comprising if the access point receives the second validation data unit in response to the first validation data unit, sending, to the network controller, a signal indicative of a successful installation of the second software image.

4. The method of claim 1, wherein the virtual client is a first virtual client, the method further comprising defining, at the access point, a second virtual client configured to receive, via the network controller and the network, the second validation data unit.

5. The method of claim 1, further comprising defining a plurality of virtual clients, each virtual client from the plurality of virtual clients configured to send a stream of data units to the network controller, the plurality of virtual clients configured so that a number of virtual clients from the plurality of virtual clients is more than fifty percent of the computing resources of the access point are used.

6. The method of claim 1, further comprising if the access point receives the second validation data unit after a predetermined time period, sending, to the network controller, the signal indicative of the failure of the receipt of the second validation data unit.

7. An apparatus, comprising:
    an access point configured to be operatively coupled to a network controller via a network, the access point including a processor configured to execute a validation module, a first software image, a first virtual client and a second virtual client; and
    the first virtual client configured to send a validation data unit via the network controller to the second virtual client,
    the validation module configured to send a signal indicative of a successful installation, at the access point, of a second software image, the validation module configured to send the signal in response to receiving an indication that the second virtual client received the validation data unit, the validation module configured to send, to the network controller, a signal indicative of a failure of a receipt of the second validation data unit if the second virtual client does not receive a subsequent validation unit from the network controller.

8. The apparatus of claim 7, wherein the validation data unit is a first validation data unit, the first virtual client is configured to send a second validation data unit to the second virtual client via a path that excludes the network.

9. The apparatus of claim 7, wherein the first virtual client that is configured to initiate a Dynamic Host Configuration Protocol request such that the first virtual client is configured to communicate via the network.

10. The method of claim 7, wherein the first virtual client is configured to request an internet protocol address for the first virtual client via the network, the internet protocol address being included in the Dynamic Host Configuration Protocol request such that the first virtual client is configured to communicate via the network.

11. The apparatus of claim 7, wherein the validation module is configured to define a plurality of virtual clients, the first virtual client and the second virtual client included in the plurality of virtual clients, each virtual client from the plurality of virtual clients configured to send a stream of data units to the network controller, the plurality of virtual clients configured so that a number of virtual clients from the plurality of virtual clients is more than fifty percent of the computing resources of the access point are used.

12. The apparatus of claim 7, wherein the first virtual client is configured to send the validation data unit at a first time, the first virtual client is configured to send at a second time after the first time, to the network controller, a signal indicative of a status of the software upgrade.

13. A method, comprising:
receiving, at an access point and from a network controller via a network, an indication of a network fault;
defining, in response to the indication and at the access point, a virtual client that is configured to send, to the network controller, a first validation data unit that causes the network controller to send a second validation data unit;
if the access point receives the second validation data unit in response to the first validation data unit, sending, to the network controller, a signal indicative of a receipt of the second validation data unit; and
sending, to the network controller, a signal indicative of a failure of a receipt of the second validation data unit if the virtual client does not receive the second validation unit from the network controller.

14. The method of claim 13, wherein the virtual client is a first virtual client, the method further comprising defining at the access point, a second virtual client that is configured to receive, via the network controller and the network, the second validation data unit.

15. The method of claim 13, further comprising defining the virtual client such that the virtual client configured to request an Internet protocol address for the virtual client via the network, the internet protocol address being included in the first data validation unit.

16. The method of claim 13, wherein the indication of the network fault was initiated by an administrator.

17. The method of claim 13, further comprising if the access point received the second validation data unit after a pre-determined time period in response to the first validation data unit, sending, to the network controller, the signal indicative of the failure of the receipt of the second validation data unit.

18. The method of claim 13, further comprising:
in absence of receiving the second validation unit from the network controller:
uninstalling a first software image installed at the access point; and
installing a second software image previously installed at the access point.

* * * * *